United States Patent [19]

Davis

[11] Patent Number: 4,811,576

[45] Date of Patent: Mar. 14, 1989

[54] HOOP FOR STRETCHING ANIMAL PELTS

[76] Inventor: Russell G. Davis, c/o J. D. Fur Co., R.R. #1, Elbow Lake, Minn. 56531

[21] Appl. No.: 138,813

[22] Filed: Dec. 28, 1987

[51] Int. Cl.[4] .............................................. A01M 31/00

[52] U.S. Cl. .......................................... 69/19.3; 69/19; 69/19.1; 69/19.2; 38/102; 38/102.1; 38/102.4

[58] Field of Search .................... 38/102, 102.1, 102.2, 38/102.3, 102.4, 102.8; 69/19, 19.1, 19.2, 19.3

[56] References Cited

U.S. PATENT DOCUMENTS

| | | | |
|---|---|---|---|
| 1,030,073 | 6/1912 | Gibbs | 38/102.2 |
| 2,494,949 | 1/1950 | Langdahl | 69/19.1 |
| 2,594,902 | 4/1952 | Frazier | 69/19.1 |
| 2,704,415 | 3/1955 | Shiffman | 38/102.8 |
| 4,441,267 | 4/1984 | Doss | 38/102.8 |

*Primary Examiner*—Werner H. Schroeder

*Assistant Examiner*—Jeanette E. Chapman

*Attorney, Agent, or Firm*—M. Lee Murrah

[57] ABSTRACT

Animal pelts of varying sizes are stretched on a hoop made of a single length of elongated resilient metal bar formed into a circular shape with its ends overlapping in a portion of its circumference. One end of the bar is terminated with a swivelled clamp comprising a toroidal guide through which the adjacent overlapping section of the hoop passes and through the side of which a screw having a T-handle is passed to engage and clamp the hoop. The other end of the bar is terminated with a swivelled, toroidal guide through which passes the adjacent overlapping section of the hoop. One or more flexible, tubular retainers are positioned between the two ends over both adjacent overlapping sections of the hoop to prevent warping.

17 Claims, 2 Drawing Sheets

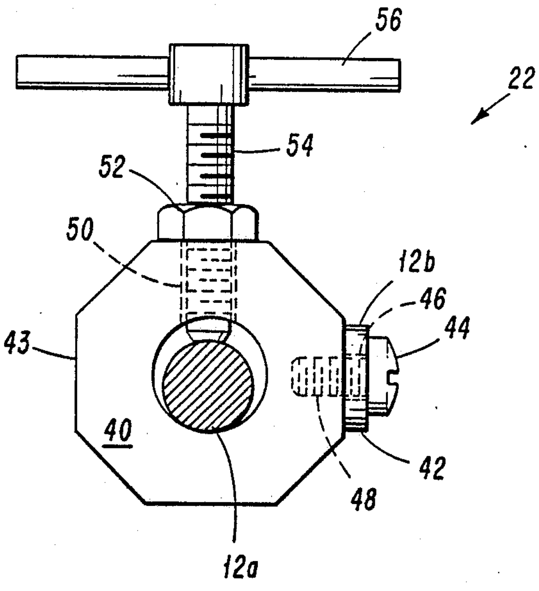
FIG 3
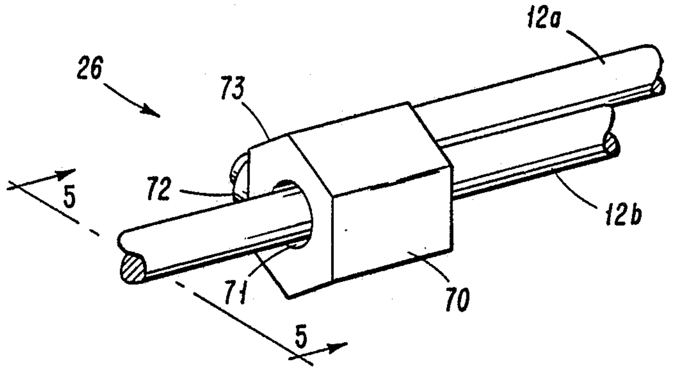
FIG 4
FIG 5
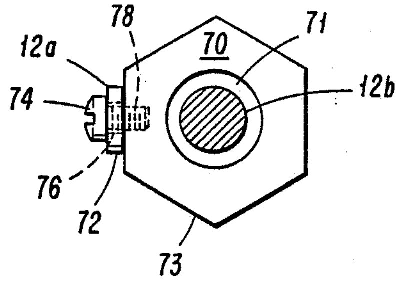
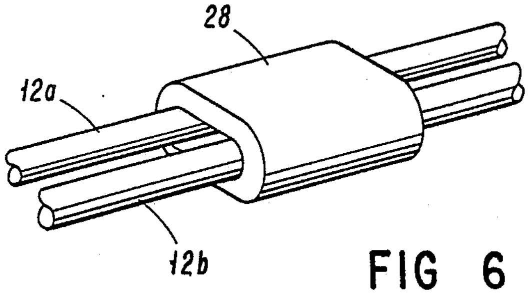
FIG 6

HOOP FOR STRETCHING ANIMAL PELTS

BACKGROUND OF THE INVENTION

The invention relates to trapping, and more particularly to hoops for stretching animal pelts for drying.

Animal pelts, such as beaver, are commonly stretched and laced onto hoops for drying. A very common early method of preparing a hoop was to bend a thin willow or other suitably flexible sapling into a circular shape and tie the overlapping ends together with string or leather strips. This method is described in *The Trapper's Handbook* (A. R. Harding Publishing Co., Columbus, OH—1951), pp. 10-12, and *Fur Trapping* by Bill Musgrove (Winchester Press, New York—1979), p. 166, both of which are incorporated by reference herein.

More recent hoops have been made of steel or other metal, a good example of which is described in U.S. Pat. No. 4,441,267 to Doss, which discloses a circular hoop made of a single length of thin bar material bent such that its ends overlap. The overlapping sections are clamped with standard hose clamps, which require a screwdriver or wrench to tighten and loosen. Under field conditions, the use of extra tools is an unnecessary complication and can lead to hand cuts and scrapes, and the hose clamps have a tendency to wear out rather quickly. Further, after such a hoop had been used several times, it acquires a layer of grease and oil from the pelts, which causes the relatively loose gripping hose clamps to slip. In addition, it has been found that the larger sizes of such pelt stretchers necessary to accommodate pelts such as that of the Northern beaver become structurally unstable and can warp into a figure-8, or pretzel, shape when retracted due to the stresses in bent metal. When a pelt is stretched on the hoop, the additional forces imparted by the drying pelt, when coupled with the aforementioned clamp slippage, causes the pelt to dry with wrinkles which reduces the market value of the pelt. Finally, the hose clamps do not limit the extent to which the hoop can be expanded, and thus they permit the overlapped sections to separate, which can be dangerous to the user and which at a minimum requires a time consuming reassembly operation.

The hoop style disclosed by Doss uses a fixed hook portion integrally formed on the end of the overlapping portions. It has been found that this type of guide has a tendency to bind due primarily to hoop warping as the diameter of the hoop is changed. This is particularly true if the hooks are not formed at the correct angle with respect to the remainder of the hoop.

It is therefore an object of the present invention to provide an animal pelt stretcher whose size is easily adjustable to fit various pelt sizes.

It is another object of the present invention to provide an animal pelt stretcher which may be used without special tools.

It is a further object of the present invention to provide an animal pelt stretcher which produces flat, unwrinkled cured pelts.

It is still another object of the present invention to provide an animal pelt stretcher which does not warp and is thus easy to handle.

It is still a further object of the present invention to provide an animal pelt stretcher whose size can be changed with minimum binding.

It is yet another object of the present invention to provide an animal pelt stretcher having a clamp which resists slippage during use.

SUMMARY OF THE INVENTION

With these and other objects in view, a pelt stretcher is made from a metal rod and is formed into a hoop with its ends overlapping. Each end has a swivelled collar attached thereto and having the adjacent overlapping section passing therethrough. One collar is provided with an integral clamp, which preferably is a screw with a T-handle on the end thereof and passing through the periphery of the collar to frictionally engage the overlapping section passing the collar to prevent movement of the overlapping section therethrough. Both adjacent overlapping sections are passed through a tubular retainer positioned between the collars to maintain the overlapping section in juxtaposition.

BRIEF DESCRIPTION OF THE DRAWINGS

The invention may be more fully understood by reading the following description in conjunction with the appended drawings wherein:

FIG. 3 is a cross-section of the T-handle clamp of FIG. 2 taken along line 3—3;

FIG. 4 is an isometric view of a swivelled guide for securing the second end of the hoop of the pelt stretcher of FIG. 1;

FIG. 5 is a cross-section of the guide of FIG. 4 taken along line 5—5; and FIG. 6 is an isometric view of a retainer for securing together overlapping portions of the hoop of the pelt stretcher of FIG. 1.

DETAILED DESCRIPTION OF A PREFERRED EMBODIMENT

Figure 1:
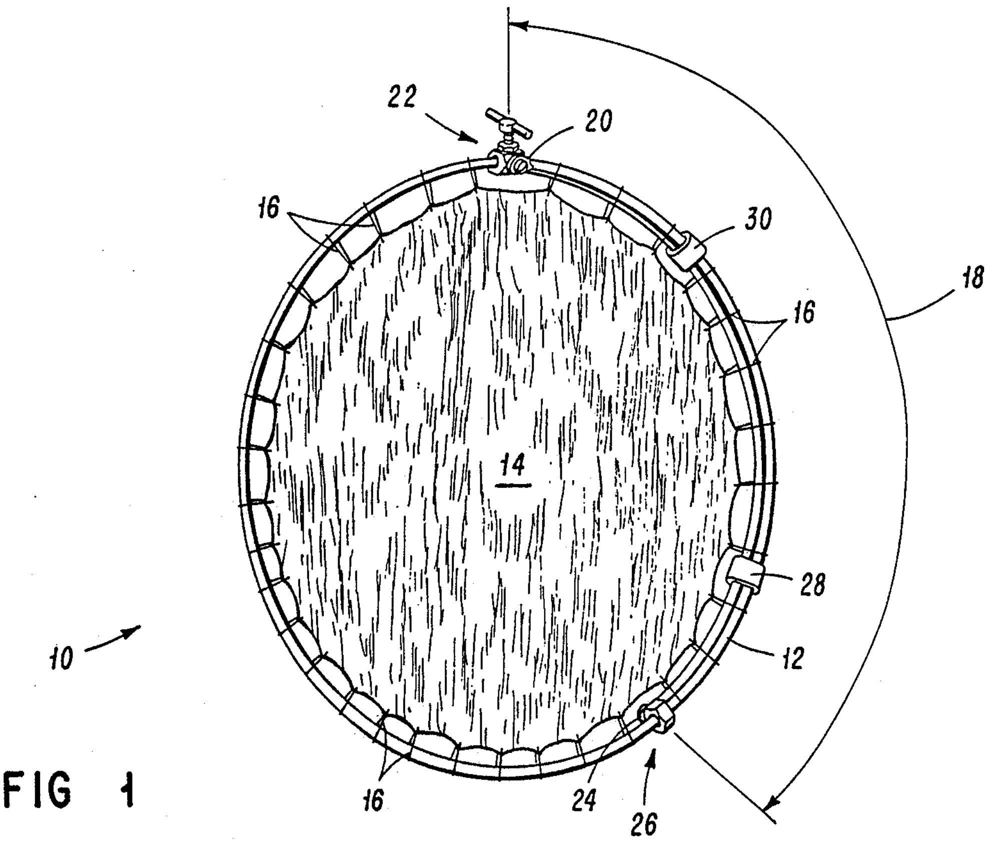
FIG. 1 is a plan view of a stretched pelt mounted on a hoop in accordance with the present invention.

Referring to FIG. 1, the pelt stretcher 10 of the present invention has a generally circular hoop 12 over which may be stretched a pelt 14. While the present invention is particularly suited for beaver pelts, it may be used for any other suitable pelt. Pelt 14 may be secured to hoop 12 by means of a multiplicity of hooks, or the like, 16 spaced around the periphery of pelt 14 and hoop 10.

Hoop 12 is comprised of a single length of elongated resilient metal, such as steel rod, formed into a circular shape, with its ends overlapping in a portion of its circumference in the area shown by arrow 18. The first end 20 of circular hoop 12 is terminated with a T-handle clamp 22 which will be more particularly described in connection with FIGS. 2 and 3. The other end 24 is terminated by a guide 26, which will be more particularly described in connection with FIGS. 4 and 5. In addition to the merits hereinafter described, clamp 22 and guide 26 serve to limit the extent to which hoop 12 can be expanded and keeps hoop 12 from coming apart. Intermediate ends 20 and 24, one or more tubular retainers 28 and 30 circumfuse both overlapping portions of hoop 12. Retainers 20 and 24 are preferably of a flexible material such as rubber conduit.

Figure 2:
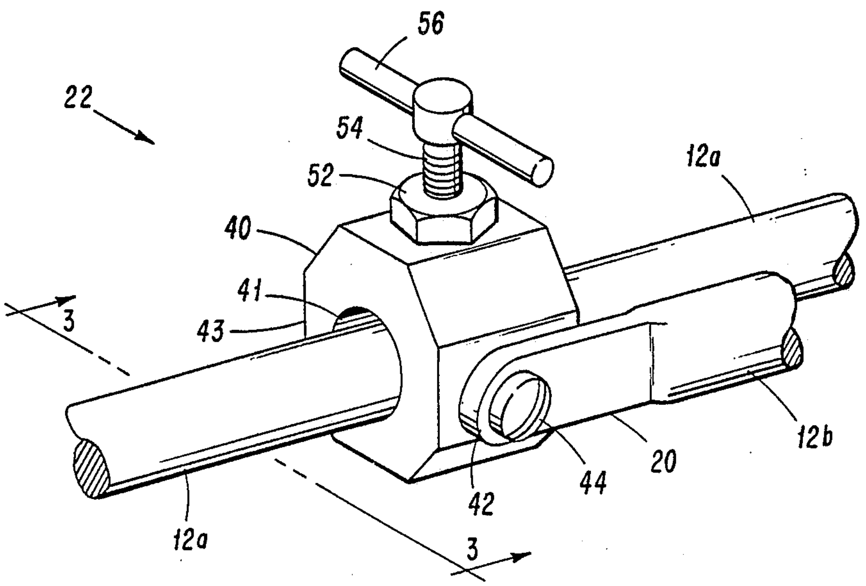
FIG. 2 is an isometric view of a swivelled T-handle clamp for securing the first end of the hoop of FIG. 1 at a desired diameter.

Referring now to FIGS. 2 and 3, T-handle clamp 22 is shown in greater detail. Clamp 22 includes a generally toroidal collar 40, which may comprise a nut, whose eye 41 is sufficiently large to permit passage of a hoop portion 12a therethrough. Collar 40 is secured to a flattened portion 42 on the first end 20 of hoop portion **12*b* by swivelled means comprising a fastener, such as a screw 44, which passes through a hole 46 in flattened portion 42 and is set in a threaded hole 48 located on the periphery of collar 40. Screw 44 is preferably set orthagonally to the plane of hoop 12. The size of hole 46 and the length of screw 44 are chosen so that collar 40 may swivel with respect to hoop end 20. The swivel arrangement permits collar 40 to more easily follow irregular bends in hoop 12, and thus prevents binding, as the diameter of hoop 12 is changed. Alternatively, screw 44** can be replaced by a rivet or other such securing device.

A hole 50 is cut in the periphery 43 of collar 40, preferably in the plane of hoop 12, and a nut, or the like, 52 is attached as by welding to collar 40 with its eye in registry with hole 50 in collar 40. Alternatively, hole 50 could be threaded, and nut 52 could be eliminated, although the preferred embodiment permits easy manufacture. A bolt 54 sized to mate with the threads in nut 52 is inserted into nut 52 and screwed down until it frictionally engages hoop portion **12*b*, to thereby secure hoop portions 12*a* and 12*b* in a fixed relationship, which in turn fixes the diameter of hoop 12. Bolt 54 may have attached thereto as by welding a crossbar 56 which in conjunction with bolt 54** forms a T-handle which may be easily tightened by hand without the need for a wrench or screwdriver.

Referring now to FIGS. 4 and 5, guide 26 is shown in greater detail. Guide 26 includes a generally toroidal collar 70, which may comprise a nut, whose eye 71 is sufficiently large to permit passage of hoop portion **12*b* therethrough. Collar 70 is secured to a flattened portion 72 on the second end 24 of hoop portion 12*a* by swivelled means comprising a fastener, such as a screw 74, which passes through a hole 76 in flattened portion 72 and is set in a threaded hole 78 located on the periphery of collar 70. Screw 74 is preferably set in or parallel to the plane of hoop 12. The size of hole 76 and the length of screw 74 are chosen so that collar 70 may swivel with respect to hoop end 24. As is the case with collar 40, the swivel arrangement permits collar 70 to more easily follow irregular bends in hoop 12, and thus prevents binding, as the diameter of hoop 12 is changed. Alternatively, screw 74** may be replaced by a rivet, or the like.

Referring finally to FIG. 6, one of the one or more tubular retainer means which may be used on hoop 12, e.g. retainer 28, is shown. Retainer 28, which is generally tubular in shape (when relaxed) and is preferably made of rubber or other flexible material, such as a section of rubber hose is positioned to receive both of overlapping hoop portions **12*a* and 12*b* therethrough. Retainer 28 maintains hoop portions 12*a* and 12*b* in juxtaposition to prevent warping of hoop 12 from its desired planar configuration, which is caused both by the tensions inherent in bent metal and the tensions imparted by a curing pelt. This is particularly a problem when the hoop is extended to larger diameters. Warping not only makes the hoop difficult to work with but also degrades the value of the pelt. The flexibility of retainer 28 permits hoop portions 12*a* and 12*b* to be easily passed therethrough as the diameter of hoop 12** is being increased or decreased.

In operation, hoop 12 is first adjusted to the appropriate diameter to fit the size of pelt 14 that is to be dried. This is accomplished by manually loosening T-handle clamp 20 and either moving ends 20 and 24 either closer together or farther apart as the case may be. As this is done, hoop portion 12a moves through both collar 40 in T-handle clamp 22 (FIG. 2), and hoop portion 12 moves through collar 70 in guide 26. If there are any bends in hoop portions **12*a* or 12*b*, both collars 40 and 70 will swivel to provide an optimum entry orientation for such portions. In addition, hoop portions 12*a* and 12*b* move in opposite directions inside retainer 28, flexing to accommodate any bends in hoop 12 and simultaneously maintaining hoop portions 12*a* and 12*b* in substantially parallel juxtaposition. When the desired diameter is attained, T-handle clamp is manually tightened to secure the adjacent hoop portions 12*a* and 12*b*** into a longitudinally fixed relationship.

While particular embodiments of the present invention have been shown and described, it is obvious that minor changes and alterations may be made therein without departing from the true scope and spirit of the invention. It is the intention in the appended claims to cover all such changes and modifications.

I claim:

1. A pelt stretcher, comprising:
- a metal rod formed into a hoop with its first and second ends juxtaposed to form first and second overlapping section on the respective ends thereof;
- a first collar surrounding the second overlapping section;
- first swivelled means for attaching the first collar to the first end of the rod;
- means in said first collar for securing said second overlapping section against movement through said first collar;
- a second collar surrounding the first overlapping section; and
- second swivelled means for attaching the second collar to the second end of the rod;

2. A pelt stretcher as defined in claim 1 wherein said securing means comprises:
- a screw passing through said first collar for frictional engagement with said second overlapping section; and
- a T-handle attached to the screw to permit manual tightening and loosening of said screw.

3. A pelt stretcher as defined in claim 2 wherein said first swivelled means comprises a fastener passing through an oversized hole in said first end of said rod and into a mating hole formed in the periphery of said first collar.

4. A pelt stretcher as defined in claim 3 wherein said fastener comprises a screw.

5. A pelt stretcher as defined in claim 4 wherein said second swivelled means comprises a fastener passing through an oversized hole in said second end of said rod and into a hole in the periphery of said second collar.

6. A pelt stretcher as defined in claim 5 wherein said fastener comprises a screw.

7. A pelt stretcher as defined in claim 2 further including a tube surrounding said first and second overlapping sections.

8. A pelt stretcher as defined in claim 7 wherein said tube is made of a flexible material.

9. A pelt stretcher as defined in claim 8 wherein said flexible material is rubber.

10. A pelt stretcher, comprising:
- a metal rod formed into a hoop with its first and second ends juxtaposed to form first and second overlapping sections therebetween;

a first collar surrounding the second overlapping section;

first means for attaching the first collar to the first end of the rod;

means in said first collar for selectably securing said first collar to said second overlapping section;

a second collar surround the first overlapping section;

second means for attaching the second collar to the second end of said rod; and tubular retainer means surrounding said first said second overlapping sections.

11. A pelt stretcher as defined in claim 10 wherein said first and second attaching means each comprises a swivel.

12. A pelt stretcher as defined in claim 11 wherein said swivel in said first and second attaching means each comprises a fastener passing through a hole in the respective rod ends and into a mating hole in the periphery of the respective collars.

13. A pelt stretcher as defined in claim 12 wherein each of said collars are toroidal.

14. A pelt stretcher as defined in claim 13 wherein each of said fasteners comprises a screw.

15. A pelt stretcher as defined in claim 14 wherein the retainer means is flexible.

16. A pelt stretcher as defined in claim 15 wherein said retainer means is made of rubber.

17. A pelt stretcher, comprising:

a metal rod formed into a hoop with its first and second ends in parallel juxtaposition to form first and second overlapping section on the respective ends thereof;

a toroidal collar surrounding the second overlapping section;

swivelled means for attaching the first collar to the first end of the rod;

a screw passing through said first collar for frictional engagement with said second overlapping section to secure the same against movement inside said first collar;

a T-handle attached to the screw to permit manual tightening and loosening of said screw;

a second toroidal collar surrounding the first overlapping section;

swivelled means for attaching the second collar to the second end of said rod; and a flexible tube surrounding said first and second overlapping sections.

* * * * *